US006804301B2

(12) United States Patent
Wu et al.

(10) Patent No.: US 6,804,301 B2
(45) Date of Patent: Oct. 12, 2004

(54) FIRST PASS ENCODING OF I AND P-FRAME COMPLEXITY FOR COMPRESSED DIGITAL VIDEO

(75) Inventors: Siu-Wai Wu, San Diego, CA (US); Vincent Liu, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 608 days.

(21) Appl. No.: 09/929,983

(22) Filed: Aug. 15, 2001

(65) Prior Publication Data

US 2003/0039308 A1 Feb. 27, 2003

(51) Int. Cl.⁷ .................................................. H04N 7/12
(52) U.S. Cl. ................................... 375/240.12; 348/700
(58) Field of Search ........................ 375/240.12, 240.16, 375/240.24, 240.26, 240.03; 348/699, 700, 419.1, 416.1; 382/232, 236, 242, 233

(56) References Cited

U.S. PATENT DOCUMENTS

| | | | |
|---|---|---|---|
| 5,343,248 A | 8/1994 | Fujinami | |
| 5,734,419 A | 3/1998 | Botsford, III et al. | |
| 5,751,378 A | 5/1998 | Chen et al. | |
| 5,771,316 A | 6/1998 | Uz | |
| 5,832,121 A | 11/1998 | Ando | |
| 5,909,252 A | 6/1999 | Ueda et al. | |
| 5,959,693 A | 9/1999 | Wu et al. | |
| 6,038,256 A | 3/2000 | Linzer et al. | |
| 6,044,115 A | 3/2000 | Horiike et al. | |
| 6,198,769 B1 * | 3/2001 | Mihara | 375/240.12 |
| 6,259,733 B1 | 7/2001 | Kaye et al. | |
| 6,731,684 B1 * | 5/2004 | Wu | 375/240.12 |
| 2001/0000704 A1 | 5/2001 | Fert et al. | |

FOREIGN PATENT DOCUMENTS

| | | |
|---|---|---|
| EP | 0 554 086 A2 | 8/1993 |
| EP | 0 708 564 A2 | 4/1996 |
| EP | 0 892 560 | 1/1999 |
| WO | WO 97/39577 | 10/1997 |

OTHER PUBLICATIONS

Product Brochure for Originator Encoder Model D9150, Scientific Atlanta, Inc., 2000 (6 Pages).
Product Brochure for E5611 MPEG–2 Encoder, Tandberg Television, Inc., 2000 (2 Pages).
Product Brochure for Goldline Program Encoder Series, Philips Digital Networks, (1 Page). Although no date of publication is indicated on this product brochure, Applicants believe that the brochure was published in late 2000 or early 2001.
Web pages from broadcast.philips.com describing Philips' Encoder products, Philips Digital Networks, Jan. 25, 2001 (4 Pages).
Clear Motion Integrated Noise Reduction System, DiviCom, Sep. 1999 (4 Pages).
Digital HDTV Grand Alliance System; Record of Test Results, Advanced Television Test Center, et al., Oct. 1995 (3 Pages).
Guide to the Use of the ATSC Digital Television Standard, Advanced Television Systems Committee, Apr. 25, 1995 (153 Pages).

* cited by examiner

*Primary Examiner*—Gims Philippe
(74) *Attorney, Agent, or Firm*—Barry R. Lipsitz; Douglas M. McAllister

(57) ABSTRACT

The invention relates to an improved system and method for encoding digital images within frames for digital television transmission. Every anchor frame in a first pass encoder is encoded as a P-frame. Groups of macroblocks, such as slices in the P-frame, are alternately encoded as I-slices and P-slices. This allows both I and P encoding complexity to be computed in a single pass, without having to encode the same frame twice. Accordingly, the I-frame decision can be made at a second pass encoder instead of at the first pass encoder, thus taking advantage of a look-ahead pipeline architecture to more effectively align the I-frames with scene changes.

16 Claims, 4 Drawing Sheets

FIRST PASS ENCODING OF I AND P-FRAME COMPLEXITY FOR COMPRESSED DIGITAL VIDEO

BACKGROUND OF THE INVENTION

The present invention relates to an improved system and method for encoding digital images within frames for digital television transmission.

Digital television offers viewers high quality video entertainment with features such as pay-per-view, electronic program guides, video-on-demand, weather and stock information, as well as Internet access. The video images, packaged in an information stream are transmitted to the user via a broadband communication network over a satellite, cable, or terrestrial transmission medium. Due to bandwidth and power limitations, efficient transmission of film and video demands that compression and formatting techniques be extensively used. Protocols such as MPEG1 and MPEG2 maximize bandwidth utilization for film and video information transmission by adding a temporal component to a spatial compression algorithm.

Each individual image in a sequence of images on film or video is referred to as a frame. Each frame is made up of a large number of picture elements (pixels) that define the image. Within each frame, redundant pixels describe like parts of a scene, e.g. a blue sky. Various types of compression algorithms have been used to remove redundant spatial elements thereby decreasing the bandwidth requirements for image transmission. Sequences of frames on film or video often contain pixels that are very similar or identical. In order to maximize bandwidth utilization, compression and motion compensation protocols, such as MPEG, are typically used to minimize these redundant pixels between adjacent frames. Frames referenced by an encoder for the purpose of predicting motion of images within adjacent frames are called anchor frames. These anchor frames can be of type Intra-frame (I-frame) or Predicted-frame (P-frame). Groups of pixels (macroblocks) that are mapped without reference to other frames make up I-frames, while P-frames contain references to previously encoded frames within a sequence of frames. A third type of frame referred to as a Bi-directional (B-frame) contains macroblocks referred from previously encountered frames and macroblocks from frames that follow the frame being currently analyzed. This entails a type of look-ahead scheme to describe the currently analyzed image in terms of an upcoming image. Both B-frame and P-frame encoding reduce duplication of pixels by calculating motion vectors associated with macroblocks in a reference frame, resulting in reduced bandwidth requirements. MPEG-2 encoding and MPEG-1 encoding differ in their support of frame slices. Slices are consecutive groups of macroblocks within a single row defined for a frame that can be individually referenced. Typically slices are of the same type, i.e. all P-frame encoded or all I-frame encoded. The choice of encoding type for a particular frame is dependent upon the complexity of that image.

In MPEG-2 digital video systems, the complexity of a video frame is measured by the product of the quantization level used to encode that frame and the number of bits used for coding the frame. This means the complexity of a frame is not known until it has been encoded. As a result, the complexity information always lags behind the actual encoding process, which requires the buffering of a number of frames prior to encoding, thereby adding expense and complexity.

Furthermore, selection of I-frame versus P-frame encoding protocol typically requires multiple encoding passes on a single frame to determine the complexity of the encoding. If a P-frame encoding results in a greater complexity than would be realized using I-frame encoding, then I-frame encoding would be selected. Ideally, an anchor frame should be coded twice in the first pass encoder to generate the complexity measure for both I and P cases, but computational overhead typically limits such an approach. From a bandwidth utilization viewpoint, it would be most effective to code for P-frames except where the image complexity would call for I-frame encoding, e.g. at scene changes. One problem with requiring multiple encoding passes on a single frame is the increased computational complexity introduced, thereby reducing the throughput of the encoder. Another problem with this approach is the inherent inefficiency of having to encode a frame twice.

Accordingly, there is a need for an improved complexity encoding system. The system should enable effective scene change detection to be performed. Furthermore, the system should be usable with essentially any type of video data, including high-definition (HD) and standard-definition (SD) television (TV). The present invention provides a solution for solving these problems while providing enhanced throughput of film or video frame encoding.

SUMMARY OF THE INVENTION

A method and accompanying apparatus for specifying the digital video frame type and Group-Of-Pictures (GOP) length for a succession of video signals is presented.

The present invention alternately encodes both I-frame and P-frame macroblocks within a single frame. By doing so, both I and P encoding complexity can be computed without encoding the same frame twice. This arrangement allows the I-frame decision to be made at the second pass encoder instead of at the first pass encoder, thus taking advantage of a look-ahead pipeline to more effectively align the I-frames with scene changes. This method also reduces the computational encoding complexity.

The invention comprises a two-pass video encoding system whereby the first pass encoding entails assigning to each successive anchor frame a Predicted frame (P-frame) encoding type alternating, e.g., with two successive Bi-directional encoded frames (B-frames). Generally, frame encoding type assignments can either be Intraframe (I-frame), Predicted frame (P-frame) or Bi-directional frame (B-frame) encoding.

For the purpose of computing the complexity of each video frame in a single pass, each P-frame is partitioned into interleaving Intra-frame encoded macroblocks; e.g. I-slices and Predicted-frame encoded macroblocks, e.g. P-slices. Between two adjacent P-frames, these slices are encoded in alternating positions. For each of the encoded frames, a complexity measure is calculated and sent to a second-pass encoder for further processing. The complexity measure for each frame type is equal to a product of the total number of bits generated by the slices within a frame and a value associated with a nonlinear mapping of the relationship between a quantizer level and the generated bits. The step of calculating the complexity measure for both P-frame encoding and I-frame encoding for a single anchor frame is performed in one pass, allowing an I-frame to be specified at the second pass encoding instead of the first-pass encoding. This is advantageous because of possible scene change frames that might be introduced in later frames that would require I-frame type assignment. It is more efficient to extend the Group-Of-Pictures (GOP) from it's default length and to include a scene change frame with an assigned I-frame type. Scene change frames are detected by the first pass encoder using a scene change detection algorithm, however, frame type assignment is performed during a second pass encoding. A scene change frame is identified by calculating the relative difference between a P-frame complexity measure and an I-frame complexity measure for a frame, and evaluating the calculation with respect to a threshold value. A scene change notification associated with each of the scene change frames is sent to the second-pass encoder for processing.

The pipeline architecture of the second pass encoder provides a look-ahead buffer capability for efficient encoding of successive video frames. It is used both for P-frame and B-frame encoding algorithms and for identifying a scene change frame in a forthcoming frame and thereby inhibiting the assignment of an I-frame until the forthcoming frame is processed. A counter is incremented for each frame processed. In the second-pass encoder, the scene change notifications associated with each of the scene change frames are sent to a succession of delay elements, where they are buffered and concurrently used for analyzing the respective frame by the second pass encoder. A counter is incremented for each scene change detected and decremented during processing of the frame. By analysis of the complexity coefficient provided by the first-pass encoder, a frame encoding type (P, B or I) is assigned to each frame in a succession of frames using a pipeline processing architecture. A scene change frame can only be designated as an I-frame or a P-frame. An I-frame is assigned to the first frame that begins a Group of Pictures (GOP) and the frame count is reinitialized at each GOP designation. If no scene changes occur, the GOP length is conformed to a preset nominal refresh rate. In the case of scene changes occurring, the frame length is adjusted as needed. If the frame count exceeds a maximum value, an I-frame will be encoded even if nonstop scene changes occur. Also, if the frame buffer becomes too full, then an I-frame is encoded to avoid losing video information. In the cases where a scene change frame occur, a new GOP is generally encoded at the scene change frame. However, the encoding of intra-coded (I) frames is inhibited for as long as the scene change count has a value greater than zero, except for the last scene change frame in a burst of scene change frames.

DETAILED DESCRIPTION OF TIRE INVENTION

The present invention relates to an improved video frame encoder sub-system and method for enhanced digital television signal transmission. Specifically, it addresses the need to reduce computational complexity during encoding of video frames in order to more effectively align I-frames with scene changes and perform a more effective scene change detection algorithm.

Figure 1:
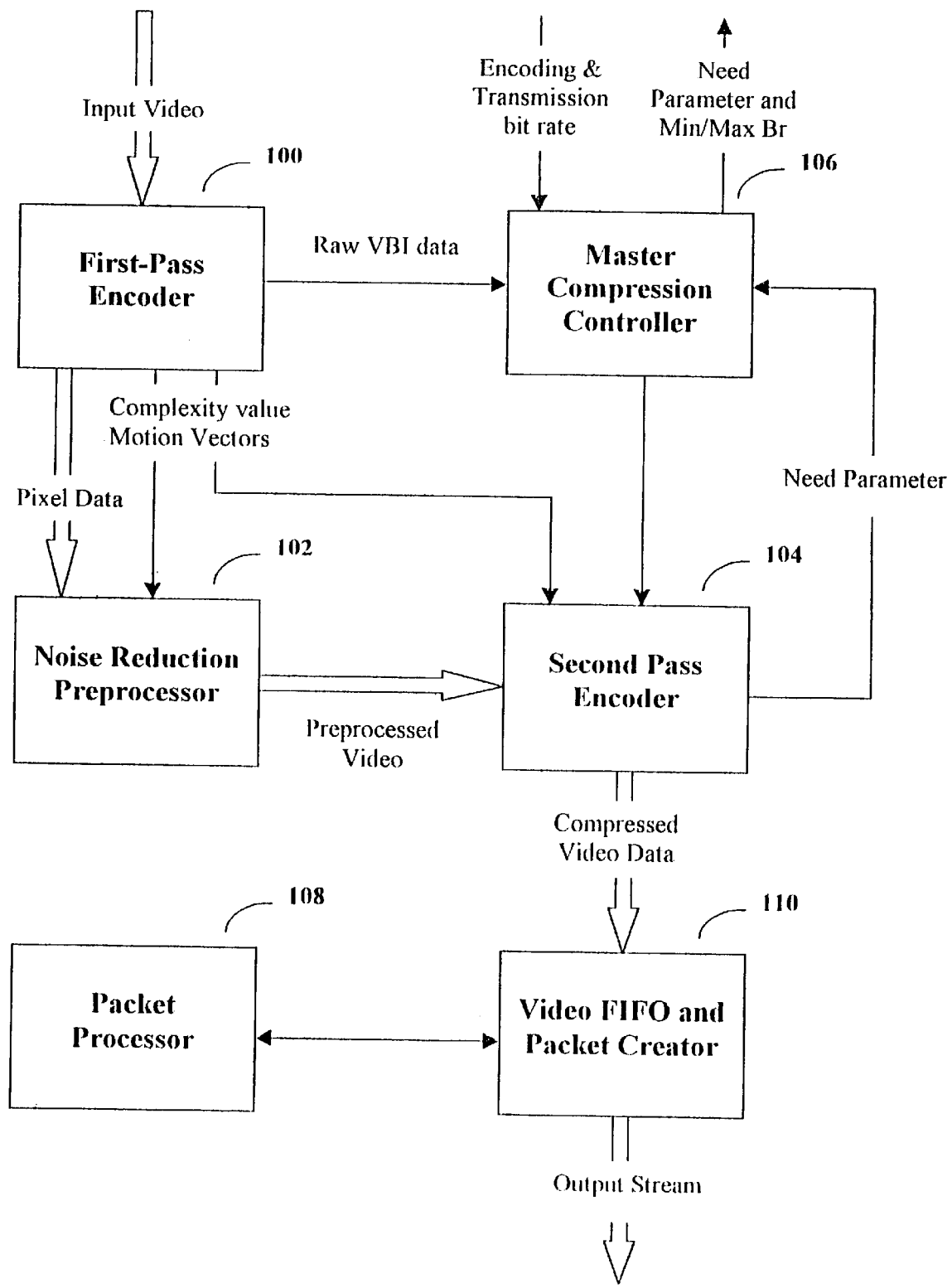
FIG. 1 illustrates a processing architecture block diagram in accordance with the present invention.

FIG. 1 is a block diagram of the processing architecture of the video frame encoding sub-system in accordance with the present invention. The sub-system is one part of a digital video encoding system.

The sub-system is composed of the following elements:
a first pass encoder 100
a noise reduction preprocessor 102
a second pass encoder 104
a master compression controller (MCC) 106
a packet processor 108
a video FIFO queue and packet creator 110

System Overview

The first pass encoder 100, noise reduction preprocessor 102 and second pass encoder 104 act in concert to estimate the complexity of incoming video frames, filter the incoming video for noise, and are responsible for compressing the incoming video images. The second pass encoder prepares need parameters, and provides this information to a rate control processor (not shown), which in turn provides a corresponding encoding bit rate allocation to the second pass encoder. In effect, the cascade of first and second pass encoders encodes a single channel of input data and performs data compression that includes motion compensation (for P- and B-frames), discrete cosine transform (DCT) and quantization. The encoders may provide feedback information to the rate control processor regarding the actual encoding bit rate. A master compression controller (MCC) 106 controls the compression of the data for the encoders via a peripheral component interconnect (PCI) bus. The encoded data is provided to a packet creator 110 that works in connection with a packet processor 108 to provide a multiplexed bitstream of video data. A video first-in, first-out (FIFO) buffer associated with the packet creator 110 temporarily stores the compressed data, and the packet processor 108 forms packets of the compressed data with appropriate header information, e.g., according to the MPEG-2 or other video standard. Thereafter, the data is sent to a transmitter for transmission of the output stream across a communication channel.

At a decoding side, a receiver, a buffer, and a demultiplexer are provided to output a decoded video signal, e.g., for display on a television.

List of variables

| Name | Description |
|---|---|
| alpha | picture feedback factor |
| BitRate | Video bit rate (bits per second) |
| BufferLevel | The number of bits in the frame buffer |
| ComplexityI | I-frame complexity value |
| ComplexityP | P-frame complexity value |
| DelayedSc | delayed scene change flag |
| FrameCount | a count of the number of frames in the GOP |
| FrameRate | Frame rate of the input video (frames per second) |
| GopLen | Number of Frames in the GOP |
| MaxDecoderBufferLevel | Maximum number of bits decoder can hold |
| MaxGopLen | Maximum number of frames in GOP |
| PictureType | Frame type (I, P, or B) |
| PrePicType | Initial value of frame type |
| Sc | Scene change flag |
| ScCount | Scene change counter |
| StartNewGOP | Start New GOP flag |
| TargetBufferLevel | A moderately filled buffer level |
| ThBuf | Buffer threshold |

Complexity Estimation

The first pass encoder generates a look-ahead complexity of every video frame by encoding the video frame at a nominal fixed quantizer scale (e.g. use q=20 on a 1 to 112 scale). The number of bits generated by the first pass encoding is used as a measure of the complexity of the frame. In order to make use of this look-ahead complexity, the picture coding type of a frame in the second pass encoding has to match the picture coding type of the same frame in the first pass encoding. However, because of possible scene changes, the location of an I-frame is not determined until the second pass encoding. Ideally, an anchor frame (non-B frame) should be coded twice in the first pass encoder to generate the complexity measure for both I and P cases, but practically there may not be enough processing cycles on the encoder to support this approach.

The processing architecture of the present invention uses a novel algorithm, discussed below, to generate both I and P complexity measures by the first pass encoder without requiring double encoding.

Every anchor frame in the first pass encoder is encoded as a P-frame, i.e., the sequence of first pass encoded frames has the following pattern:

... PBBPBBPBBPBBP ...

Figure 2:
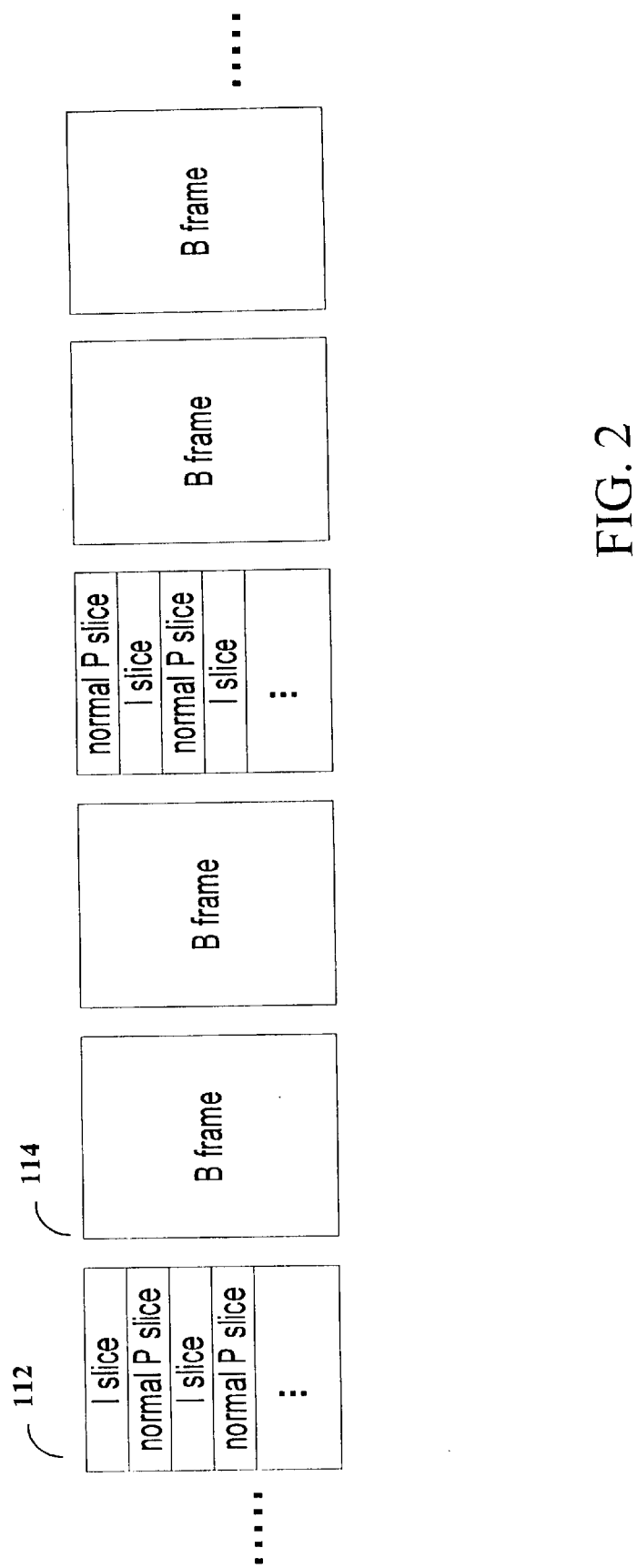
FIG. 2 illustrates a coding type for each frame in a group of pictures (GOP) in accordance with the present invention.

Within a P-frame, macroblocks can be encoded as either Intra-frame or Predicted frame. These macroblocks can be placed within the frame as desired. Consecutive macroblocks, displaying the same coding (I or P) type can be concatenated into encoding elements. If they occur in a single row within the frame, they are called slices. I-Slices can be interleaved with P-slices. For example, every other slice can be encoded as an I-slice and the positions of the I-slices and normal P slices switches every other frame 112, as shown in FIG. 2. Alternatively, the same encoding could be used without switching the pattern in alternate frames. Also, the direction of the slices can be positioned vertically within a frame instead of horizontally, representing a column of consecutive like-encoded macroblocks. A number of other encoding schemes using this concept can be imagined.

In the example shown in FIG. 2, the location of B-Frames 114 is also shown. The I, P and B frame complexity values are calculated in the following manner:

complexity[I]=f(Q)*(2* Total number of bits generated by the I slices in a P-frame).

complexity[P]=f(Q)*(2* Total number of bits generated by the normal P slices in a P-frame).

complexity[B]=f(Q)*(Total number of bits generated by all slices in a B frame)

where Q is the fixed quantizer scale value used in the first pass encoding, and f(Q) is a non-linear mapping implemented as a lookup table to compensate for the non-linear relationship between the quantizer level and the bits generated. For this embodiment, the nonlinear mapping is defined as the square root function such that f(Q)=square root of Q.

After processing, the first pass encoder calculates the complexity coefficient and sends this evaluation to the second pass encoder as a 32 bit floating-point number. Because of the importance of detecting scene changes in specifying the frame coding type, the algorithm will be described in the following sections.

Processing Pipeline

In the encoder firmware architecture, a frame is classified as a B-frame or a P-frame at the first stage (Luma Preprocessing) of the processing pipeline. Once a picture is classified as a B-frame, the picture coding type cannot be changed in the later stage of the processing pipeline. However, if a picture is classified as a P-frame, it may be converted into an I-frame to start a new GOP at the final stage of the pipeline when the picture is actually encoded.

Figure 3:
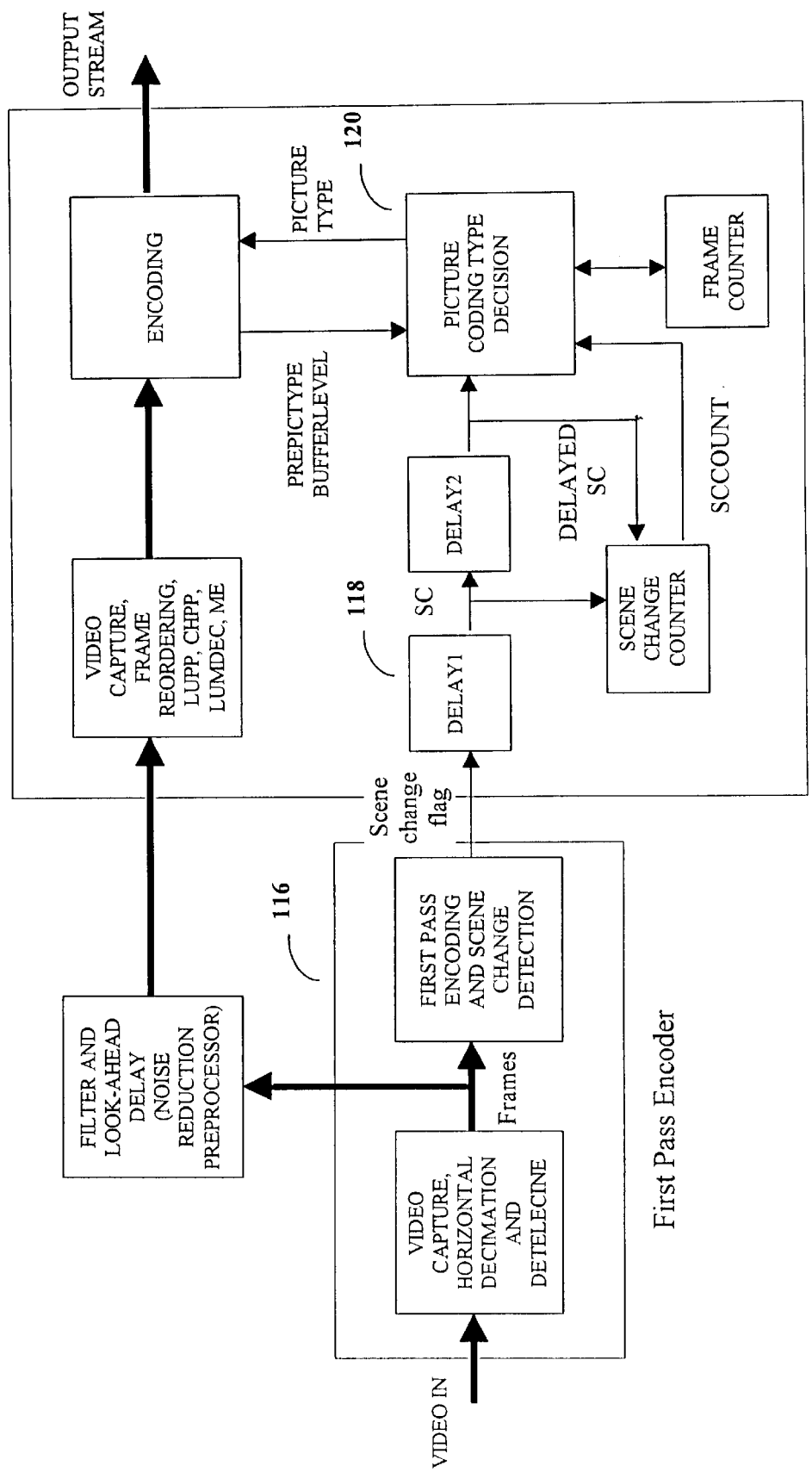
FIG. 3 illustrates a scene-change processing pipeline in accordance with the present invention.

The scene-change processing pipeline is illustrated in FIG. 3. In accordance with the video processing architecture, scene-change detection is performed in the First Pass encoder, as shown in box 116, where video capture, horizontal decimation, and detelecine is performed, followed by a first pass video encoding and scene change detection. The scene-change flag is written into a queue 118 in the Second Pass encoder where it is further processed. The queue delays the use of the scene change flag until just before the final encoding stage, where it is used to determine the I/P picture coding type, as shown at Box 120. In the figure, the acronyms LUPP is an abbreviation for luma preprocessing, CHPP is an abbreviation for chroma preprocessing, LUMDEC is an abbreviation for luma decimation, and ME is an abbreviation for motion estimation. The second pass encoder further functions to perform video capture and frame reordering and encoding functions. The Noise Reduction Preprocessor filters and provides a look-ahead delay for the video stream.

Scene Change Detection

A scene change is detected after the complexity measure is calculated. The scene change flag is defined only for P-frames and it is determined by comparing the I complexity versus the P complexity that is estimated from the first pass encoding of a P-frame. The I-complexity and P-complexity values are calculated by encoding alternate slices in the P-frame as I slices and P slices. The I-complexity is computed as the sum of all I slice bits; the P complexity is computed as the sum of all P slice bits. The algorithm is as follows:

if (alpha*ComplexityP>ComplexityI)
   sceneChange=TRUE
else
   sceneChange=FALSE
alpha is constant, e.g. alpha=0.9.

Once the scene change flag is set, the picture coding type decision can more easily be made.

I/P Picture Coding Type Decision.

Normally, the Frame Counter increments by one for every frame encoded by the second pass encoder. A P-frame is converted to a refresh I-frame to start a new Group of Pictures (GOP) when the value of the Frame Counter (FrameCount) reaches a preset nominal refresh rate (GopLen). The Frame Counter is reset to 0 at the I-frame. When a scene change is detected on an upcoming P-frame, the algorithm inhibits the issuing of an I-frame until the P-frame that triggers the scene change flag is processed. At that point, the P-frame is converted into an I-frame and the process extends the GOP to align the new I-frame with the scene change. If the scene change P-frame occurs beyond the look-ahead window, the algorithm will convert the P-frame exhibiting the scene change into an I-frame, thereby aligning the scene change with the I-frame by reducing the GOP length.

The deviation of the I-frames from normal refresh is determined by the number of frames in the look-ahead window (Delay2 in FIG. 3). Delay2 is set to eight video frames (becomes six or seven frames if the input is film). Assuming a refresh rate of fifteen frames and two B-frames, this amount of look-ahead guarantees a minimum of nine frames between a scene change frame and an I-frame, i.e., the worst case GOP is . . . IBBPBBPBBI . . . , and the maximum distance between the scene change frame (new I-frame) and the regular refresh I-frame (old I-frame) is (15+6)=21 frames.

The scene change flags determined by the First-Pass encoder are stored in a queue on the Second-Pass encoder. The scene change flag is delayed by a total of (L−1) frames, assuming the delay is constant, where L is the total delay of the video frames on the MAP. To allow the rate control algorithm to look ahead at least 15 frames in either film or video mode, L is set to 12 frames and therefore the amount of delay in Delay1, shown in FIG. 3, is (12−8)=4 video frames.

To avoid multiple I-frames when multiple scene changes occur consecutively due to flashes or special effects editing, the algorithm suspends the issuing of an I-frame until no additional scene changes are found in the look-ahead pipeline. This is achieved by a scene change counter (ScCount) which increments by one whenever a scene change frame enters the (Delay2) look-ahead pipeline and decrements by one whenever a scene change flag leaves the pipeline. An I-frame is inhibited whenever the scene change counter has a non-zero value.

Figure 4:
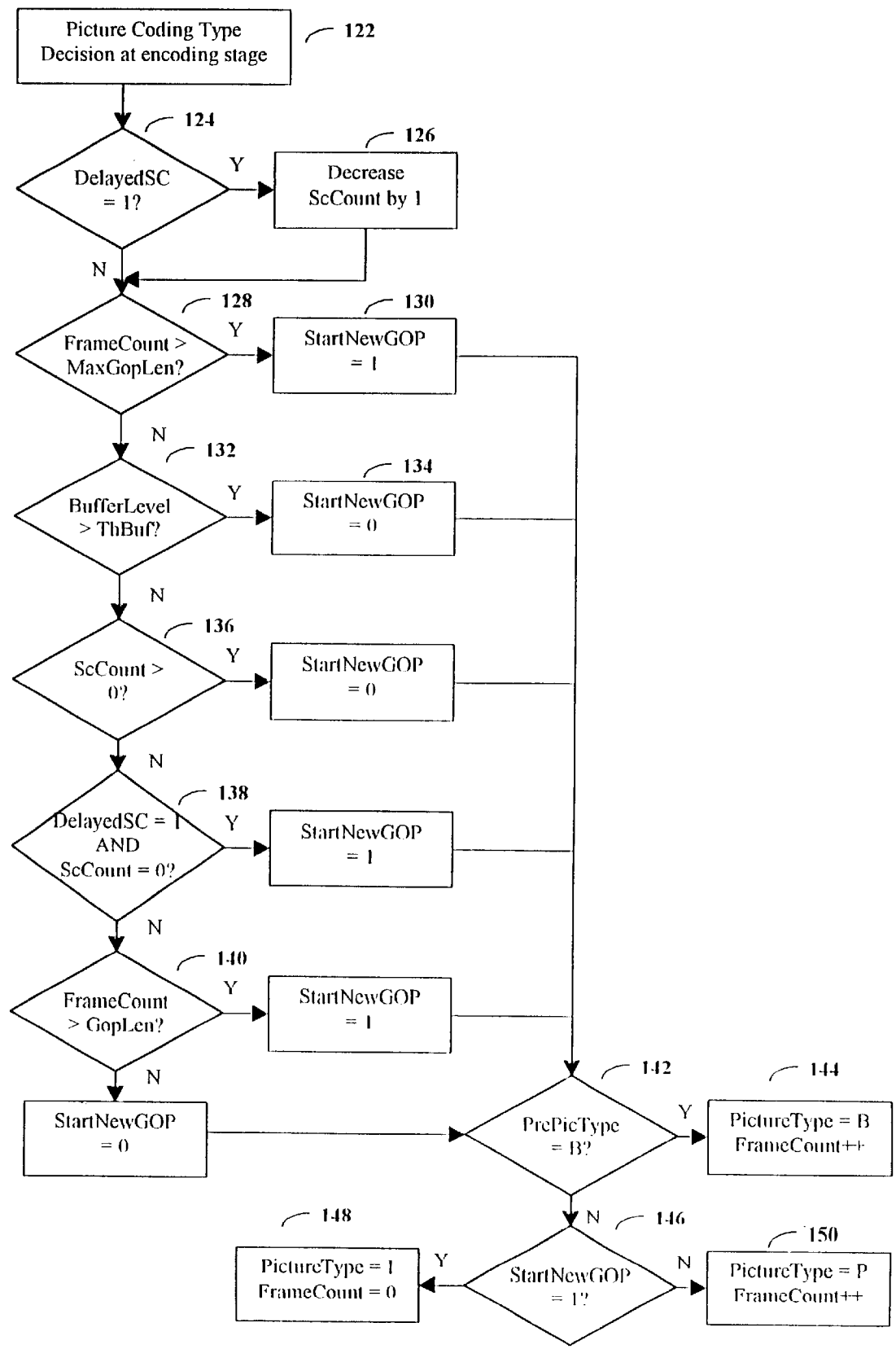
FIG. 4 illustrates a picture coding type decision algorithm in accordance with the present invention.

The algorithm also checks the fullness of the encoder buffer (BufferLevel) to make sure there is enough room in the buffer to accommodate an I-frame before it is allowed to issue an I-frame. The BufferLevel is compared with a threshold (ThBuf), which is determined as follows:

ThBuf=TargetBufferLevel+(0.5*GopLen*BitRate/FrameRate)
if (ThBuf>0.5*MaxDecoderBufferLevel)
ThBuf=0.5*MaxDecoderBufferLevel The MaxDecoderBufferLevel is the maximum number of bits the decoder can hold, which is the product of the system delay and the bit rate. The TargetBufferLevel is set to ⅓ of the MaxDecoderBufferLevel To guarantee that I-frames will be generated even if the input has repetitive scene changes, the algorithm forces an I-frame to be issued if the value of the Frame Counter reaches an upper bound, which is set to twice the value of the nominal refresh rate. A detailed picture coding type decision algorithm is described in the flow chart shown in FIG. 4. The flowchart proceeds through a set of tests before allowing an I-frame to be set, thereby indicating a GOP. Initially, A picture coding type decision is made at the encoding stage, as shown in box 122. If a delayed scene change flag (DelayedSC) is detected, box 124, then the scene change count (ScCount) is decreased by one, box 126, before further processing commences. A test for the condition where the scene change P-frame occurs beyond the look-ahead window is then performed. The FrameCount is compared to the maximum permissible GOP length (MaxGopLen). If the condition is found to be true then the StartNewGOP flag is set, box 134, before the algorithm continues. If the condition is not met then a test for a full buffer is performed, box 132. If the buffer is full, then the StartNewGOP is cleared, box 134, before the algorithm continues. Alternatively, if a buffer full condition is not met, then a test for the condition where a scene change occurs is performed, box 136. If the ScCount is non-zero, then the I-frame is postponed by clearing StartNewGOP before the algorithm continues. If, however, the ScCount is zero, and the DelayedSC is set, then the P-frame that triggered the scene change flag is processed, box 138, and the StartNew-GOP flag is set before the algorithm proceeds. If the scene change count (ScCount) is zero, but the DelayedSC is not set, then the algorithm proceeds to box 140 to test whether the frame count is larger than the GOP length. If this occurs, then an I-frame is permitted, by setting the StartNewGOP flag before the algorithm proceeds. If, however, the frame count is smaller than the GOP length, then the StartNewGOP flag is cleared, and the algorithm proceeds.

After the StartNewGOP flag has been configured as described above, the algorithm proceeds to box 142 to determine whether the PrePicType had been set to Bi-directional (B-frame). If it had, then the picture type (PictureType) for the present frame is set to B-frame, and the frame counter (FrameCount) is incremented, regardless of the state of the StartNewGOP flag. Alternatively, if the PrePicType had not been set to type B-frame, then the condition of the StartNewGOP flag is analyzed, box 146, and the picture type (PictureType) is set to I-frame, or P-frame in response to the set or clear condition, respectively, of the flag. In the case of an I-frame picture type, the FrameCount is cleared to indicate the beginning of a new GOP.

Accordingly, it can be seen that the present invention provides an improved encoder for reducing complexity of encoding digital television video data. Although the invention has been described in connection with the preferred embodiment, it should be appreciated that various modifications and adaptations may be made thereto without departing from the scope of the invention as set forth in the claims.

What is claimed is:

1. A method for specifying the digital video frame type and Group-Of-Pictures (GOP) length for a succession of video frames, comprising the steps of: in a first-pass encoding:

partitioning Predicted frames (P-frame) of successive anchor frames into interleaving Intra-frame groups of macroblocks and Predicted-Frame groups of macroblocks, calculating, for each successive video frame, a complexity measure associated with a frame encoding type, and sending each of said complexity measures to a second-pass encoding, detecting scene change frames in a succession of anchor frames, and sending a scene change notification associated with each of said scene change frames to said second-pass encoding; and in said second-pass encoding:

storing said scene change notification associated with each of said scene change frames successively in one of a plurality of delay elements, assigning a frame encoding type to each of said video frames in said succession of video frames, and assigning a subset of said video frames to a GOP designation and beginning said subset with an I-frame encoded frame.

2. The method of claim 1, wherein the frame encoding type assignment performed by said second pass encoding comprises assigning, for each video frame, one of an Intraframe (I-frame), Predicted frame (P-frame) and Bi-directional frame (B-frame) type.

3. The method of claim 1, wherein the partitioning of said P-frames into interleaving groups of Intra-frame macroblocks and groups of Predicted-Frame macroblocks can occur in any order and any direction within said P-frames.

4. The method of claim 1, wherein the complexity measure calculating step comprises calculating, for each frame type, a product of the total number of bits generated by the macroblocks within a frame of a specified frame type and a value associated with a nonlinear mapping of the relationship between a quantizer level and said generated bits.

5. The method of claim 4, further comprising the step of calculating, in one pass, the complexity measure for both P-frame encoding and I-frame encoding for a single anchor frame, allowing an I-frame to be specified at the second-pass encoding instead of the first-pass encoding.

6. The method of claim 1, wherein the first-pass frame encoding type assignment further comprises the step of identifying a scene change frame by calculating a relative difference between a P-frame complexity measure and an I-frame complexity measure of a frame, and evaluating said calculation with respect to a threshold value.

7. The method of claim 1, wherein said first pass encoding step assigns to each successive anchor frame a Predicted frame (P-frame) encoding type alternating with at least one Bi-directional encoded frame (B-frame).

8. Apparatus for encoding a digital video signal having successive video frames, comprising:

a first pass encoder for:
partitioning P-frames of successive anchor frames into interleaving Intra-frame (I-frame) groups of macroblocks and Predicted-frame (P-frame) groups of macroblocks,
calculating, for each successive video frame, a complexity measure associated with a frame encoding type and sending each of said complexity measures to a second-pass encoding,
detecting a scene change frame in a succession of anchor frames, and
sending a scene change notification associated with each of said scene change frames to said second-pass encoding; and a second-pass encoder for:
storing said scene change notification associated with each of said scene change frames successively in one of a plurality of delay elements,
assigning a frame encoding type to each of said video frames in a succession of frames, and
assigning a subset of said video frames to a GOP designation by beginning said subset with an I-frame encoding.

9. The apparatus of claim 8, wherein a noise reduction preprocessor acts to filter the incoming video signals to improve the signal to noise ratio.

10. The apparatus of claim 8, wherein a master compression controller acts to control the compression and flow of video signals throughout the system.

11. The apparatus of claim 8, wherein a video buffer acts to temporarily store video frames and the compressed data.

12. The apparatus of claim 8, wherein a packet processor forms packets of compressed data using the appropriate video standard to be transmitted over a digital network.

13. The apparatus of claim 8, wherein the first pass encoder assigns to each successive anchor frame a Predicted frame (P-frame) encoding type alternating with at least one Bi-directional encoded frame (B-frame).

14. A method for encoding digital images within frames for digital television transmission, comprising:

encoding every anchor frame in a succession of frames received by a first pass encoder as a Predicted-frame (P-frame);
alternately encoding groups of macroblocks in the P-frame as Intra-frame (I-frame) groups and P-frame groups; and
deciding whether to code a particular frame as an I-frame at a second pass encoder;
wherein a look-ahead pipeline architecture is used to effectively align the I-frames with scene changes detected in said succession of frames.

15. The method of claim 14 wherein said groups of macroblocks comprise slices of the P-frame.

16. The method of claim 14, wherein said second pass encoder assigns one of an Intraframe (I-frame), Predicted frame (P-frame) or Bi-directional frame (B-frame) encoding type to each of the frames in said succession of frames.

* * * * *